July 2, 1946.　　　F. J. HOLMES　　　2,403,282
INTERNAL-COMBUSTION ENGINE
Filed June 12, 1941　　　7 Sheets-Sheet 2

Fig. 2.

Inventor
F. J. Holmes,
By Carroll Bailey
Attorney

July 2, 1946. F. J. HOLMES 2,403,282
INTERNAL-COMBUSTION ENGINE
Filed June 12, 1941 7 Sheets-Sheet 6

Inventor
F. J. Holmes,
By Carroll Bailey
Attorney

July 2, 1946.　　　　F. J. HOLMES　　　　2,403,282
INTERNAL-COMBUSTION ENGINE
Filed June 12, 1941　　　7 Sheets-Sheet 7

Inventor
F. J. Holmes,
By Carroll Bailey
Attorney

Patented July 2, 1946

2,403,282

UNITED STATES PATENT OFFICE 2,403,282

INTERNAL-COMBUSTION ENGINE

Frederick J. Holmes, Detroit, Mich.

Application June 12, 1941, Serial No. 397,800

4 Claims. (Cl. 123—58)

This invention relates to internal combustion engines, and has particular reference to improvements in internal combustion engines of the advantageously compact, light weight, small frontal area type comprising two annular series of cylinders disposed in opposed relationship to each other about a power shaft having a wobble plate structure with which the connecting rods of the engine pistons are operatively connected, whereby said shaft is driven in response to reciprocation of said pistons.

One special object of the invention is to provide, in an engine of the type mentioned, novel port and valve means for controlling delivery of fuel to the engine cylinders and, in association with said port and valve means, novel supercharging means whereby the engine is adapted to operate efficiently at high speeds and at high altitudes as, for example, when used as a power plant of an aircraft.

Another special object of the invention is to provide a novel, anti-friction wobble plate structure and novel low-frictional-resistance means for relieving the piston rods of the engine of lateral forces, whereby the engine is rendered highly efficient and possesses long life.

With the foregoing general objects and various other more specific objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 3 is an enlarged transverse section on the line 3—3 of Fig. 1.

This application is a continuation, in part, of my prior application, Serial No. 256,503, filed February 15, 1939, now abandoned.

Referring to the drawings in detail, 10 and 11 designate a pair of cylinder blocks having heads designated as 12 and 13, respectively, and 14 designates a casing member rigidly connecting said cylinder blocks together in end to end, spaced apart relationship.

The cylinder blocks 10 and 11 are reversed duplicates of one another and each includes an annular series of cylinders 15 of which there may be any suitable or desired number, nine being arbitrarily illustrated in the present instance. Each cylinder block has the same number of cylinders as the other block and the cylinders of the respective blocks are axially alined with each other, being disposed concentrically about a power shaft 16 which is rotatably mounted in suitable bearings 17 carried by the blocks 10 and 11 and being spaced equi-distantly apart angularly.

Reciprocable in the cylinders 15 of the respective cylinder blocks are pistons 18, while connecting related or alined pistons of the respective blocks are rods 19 which preferably are hollow and which extend gas-tightly through suitable bearings 20 carried by walls 21 which close the inner or adjacent ends of the cylinders 15.

In the cylinder heads 12 and 13 are chambers 22 wherein fuel is compressed by the pistons 15 and is fired by spark plugs 23 which are carried by said cylinder heads and are controlled by any suitable ignition system with which the invention is not concerned and which, therefore, is not illustrated.

Carried by the power shaft 16 at a point midway between the inner ends of the cylinder blocks 10 and 11, is a wobble plate structure, designated generally as 24, which comprises in the present instance a hub member 25 carried by the power shaft 16 and a two-part ring element designated generally as 26 mounted on said hub member for free rotation with respect thereto through the instrumentality of a suitable anti-friction bearing 27.

The hub member 25 may be formed either as an integral part of the power shaft 16 or as an element separate from said power shaft and fixed thereto in any suitable manner. In either case, said hub member is disposed at a suitable inclination to the power shaft 16 with its axis intersecting the axis of said shaft at a point approximately midway between the inner ends of the cylinder blocks 10 and 11.

At one end of the hub member 25 is an annular flange 28, while fitted upon said hub member and engaged at one side edge against said flange 28 is an inner race member 29 of the anti-friction bearing 27 which is clamped against said flange 28 by a nut 30 threaded upon the other end of said hub member.

The ring element 26 is divided in a plane preferably midway between its sides and at right angles to the axis thereof into two mating half-sections designated as 31 and 32 which may be reversed duplicates of one another and which in accordance with the invention may be fastened together in any suitable manner as, for example, through the instrumentality of bolts 33.

Fastened between flanges 34 which extend inwardly from the two half-sections 31 and 32 of the ring element 26 is the outer race element 35 of the anti-friction bearing 27, while between said race elements 29 and 35 are disposed balls or other suitable rolling bodies 36 whereby the ring element 26 is supported by the shaft 16 at the same inclination relative thereto as the hub member 25 and also for free rotation relative to said hub member.

Extending inwardly from each of the connecting rods 19 at a point midway between its ends is a short arm 37, while rotatably mounted on each of said arms is a roller 38 having a spherical outer face.

In the ring element 26 is a series of sockets 39 which correspond in number to the number of connecting rods 19 and which open through the periphery of said ring element and are equally spaced apart therearound. These sockets are of spherical form and each of them snugly accommodates a related roller 39 which is universally movable therein. Accordingly, reciprocation of the connecting rods 19 wobbles the wobble plate structure 24 and as a result rotates the shaft 16 in a manner well known in the art. Half-portions of the sockets 39 are formed in the respective halves of the ring element 26 and these half-portions are registered to form the complete sockets when the two halves of said ring element are bolted together. In this connection, by forming the ring element 26 of two half-sections, accurate forming of the sockets 39 in said ring element, as well as disposing of the rollers 38 in said sockets, obviously is greatly facilitated.

Means separate from the connecting rods 19 is provided to hold the ring element 26 against rotation and to thereby relieve the said connecting rods of undesirable lateral forces. In the present instance this means comprises, generally speaking, a pair of fixed guides 40 located respectively at opposite sides of the ring element 26 and a pair of arms 41 extending respectively from opposite sides of said ring element and cooperating at their outer ends with said guides.

The arms 41 may be carried completely by either of the ring sections 31 or 32, either as integral parts thereof or as parts separate therefrom and suitably fastened thereto, or they may be composed of mating half-portions carried by the respective ring sections either as integral parts thereof or as parts separate therefrom and suitably fastened thereto. In the present instance they are composed of mating half-sections integral with the respective ring sections 31 and 32 and at their outer ends they are provided with cylindrical or other suitable formations 42 on which are mounted suitable bearing blocks 43 which cooperate with the guides 40.

The guides 40 may be integral parts of the casing member 14 or parts separate from said casing member and suitably fixed thereto or fixed in any other suitable manner at opposite sides of the ring element 26. In any event, said guides 40 extend longitudinally of the engine and are curved on radii struck from the point of intersection of the axis of the hub member 25 with the axis of the shaft 16, and the axes of the formations 42 are alined with the said point of intersection of the axis of the hub member 25 with the axis of the shaft 16. Accordingly, the ring element 26 is free to swing in a single plane including the axis of the shaft 16 and to rock about the alined axes of the arms 41, but is held against rotation about the hub member 25. Therefore, the connecting rods 19 are relieved of lateral forces such as might be imposed thereon in the absence of the means just described for holding the ring element 26 against rotation about the hub member 25.

The inclination of the wobble plate structure 24 relative to the shaft 16 determines, of course, the stroke of the pistons 18, and in this connection it will be understood, of course, that the spaced apart relationship of the cylinder blocks 10 and 11 and the lengths of the cylinders 15 are such in relation to the inclination of said wobble plate structure that the pistons 18 partake of proper-length strokes in the cylinders 15.

The guides 40 are illustrated in the present instance as being of channel form in cross section and as accommodating the bearing blocks 43. Said guides 40 may, however, be of any other suitable form and the blocks 43 may be constructed to cooperate therewith in any other suitable manner.

The cylinders 15 may be liquid-cooled or air-cooled in any desired manner. In the present instance they are illustrated as being jacketed to be liquid-cooled.

Axially of each of the cylinder blocks 10 and 11 is a cylindrical chamber 44 with the inner end of which communicates one or more fuel supply manifolds 45, while extending from each chamber 44 to the cylinders 15 disposed therearound are fuel ducts 46, one individual to each cylinder.

Within each chamber 44 is a hollow rotary valve 47 in the form of a cylindrical shell which has a close, free-running fit in the related chamber 44 and which may be mounted on the shaft 16 in any suitable manner for rotation therewith to control admission of fuel to the cylinders 15 through the ducts 46.

In the present instance each valve 47 comprises, in addition to the cylindrical shell thereof, a hub 48, keyed or otherwise fixed to the shaft 16, and a series of radial spokes 49 connecting said shell to said hub. The spokes 49 are located at the inner ends of the valves 47 and are in the form of fan blades which act to promote flow of fuel from the inner ends of the chambers 44 into said valves and through ports 50 in said valves into the cylinders 15 through the ducts 45, as well as to effect thorough mixing of the fuel.

Each port 50 extends a suitable distance circumferentially of its related valve 46, and the ports of the respective valves are located relative to each other, so that as said valves are rotated by the shaft 16 fuel is admitted to the cylinders 15 of the respective blocks 10 and 11 at proper times. In this connection it is pointed out that the firing order of the cylinders 15 is as usual in engines of the instant type. That is to say, first one cylinder of one of the cylinder blocks is fired and then the substantially diametrically opposite cylinder of the other block is fired and so on successively in the same direction circumferentially of the respective series of cylinders.

Within each of the hollow valves 47 is a blower 51 for forcing fuel to the related series of cylinders 15 to enable the engine to operate at high speeds and at high altitudes. Each blower comprises an annular series of blades 52 spaced a suitable distance inwardly from and disposed parallel to the related valve and to the shaft 16 and mounted in any suitable manner for rotation relative to the related valve and said shaft 16. In the present instance each blower is closed at its outer end and at its outer end is mounted, through the instrumentality of a suitable antifriction bearing 53, upon the shaft 16 for rotation about said shaft.

The closed outer end portion of each blower 51 includes a spur gear 54 disposed coaxially with the shaft 16 and extending therearound, and each spur gear 54 has meshing therewith preferably a plurality of pinions 55 which are rotatably mounted on a suitable support 56 keyed or otherwise fixed to the shaft 16 for rotation therewith. The pinions 55 mesh with a surrounding ring gear 57 which is held against rotation in any suitable manner. Thus, as the shaft 16 rotates, the pinions 55 are caused to rotate bodily therewith and as a result react from the fixed ring gear 57 to drive the spur gear 54 and the blower 51 at a considerably higher rate of speed than the shaft 16. Therefore, fuel is forced into the cylinders 15 under pressure and as a consequence the engine is enabled to operate at high speeds and at high altitudes.

The valves 47 are formed at their outer ends with inwardly extending flanges 58 which cooperate with the closed outer ends of the blowers 51 to practically completely close said valves and blowers at their outer ends against the passage of fuel and oil therethrough, but in order to insure against any escape of fuel or oil through the outer ends of the chambers 44, said chambers are closed at their outer ends by caps 59 which have packings 60 gas-tightly and liquid-tightly engaging the shaft 16 and which have their peripheral portions fitting closely in counterbored outer end portions of the walls defining the chambers 44. The ring gears 57 are accommodated in said counterbores and seat at their inner sides against shoulders at the inner ends of said counterbores, while at their outer sides they are engaged by the caps 59 which are held in said counterbores by split rings 61 or in any other suitable manner. Thus the ring gears 57 and the caps 59 are held effectively in operative assembly with the engine.

Preferably the valves 47 have funnel-like mouths extending inwardly from their inner ends into overlying relationship to the inner ends of the blower blades 52 for directing fuel from the inner ends of the chambers 44 through the open inner ends of the blowers 51 into the latter interiorly of the blades 52 thereof to be forced outwardly by said blades 52 through the ports 50 in said valves into the ducts 46 and thence into the cylinders 15. These funnel-like mouths serve additionally as obstructions to prevent fuel, forced outwardly by the blower blades, from escaping into the chambers 44 through the inner ends of the valves 47. Said mouths may be provided in any suitable manner, but conveniently and practicably they may be formed, as illustrated in the drawings, by inclined plates 62 interposed between the spokes 49.

Each of the ducts 46 communicates with its related cylinder 15 through a port 63 which is elongated longitudinally of the cylinder and which may be open from end to end or divided as herein shown, by a wall 64 to afford, between its ends, a support for the related piston 18. In either case, the outer end portion of each port 63 is positioned to be disposed outwardly of the outer end of the related piston 18 when the piston is at its limit of inward movement in the cylinder 15. Moreover, each piston 18 is hollow and is open at its inner end and is provided in the side wall thereof with a port 65 of a length to begin to register with the port 64 substantially from the time the piston begins its inward movement or power stroke substantially until it completes its outward movement or compression stroke. Furthermore, each cylinder 15 is provided with an exhaust port 66 which is located preferably diametrically opposite the intake port 63 and in a position to be disposed outwardly of the outer end of the piston 18 when the piston is at its limit of inward movement in the cylinder 15.

Figure 1:
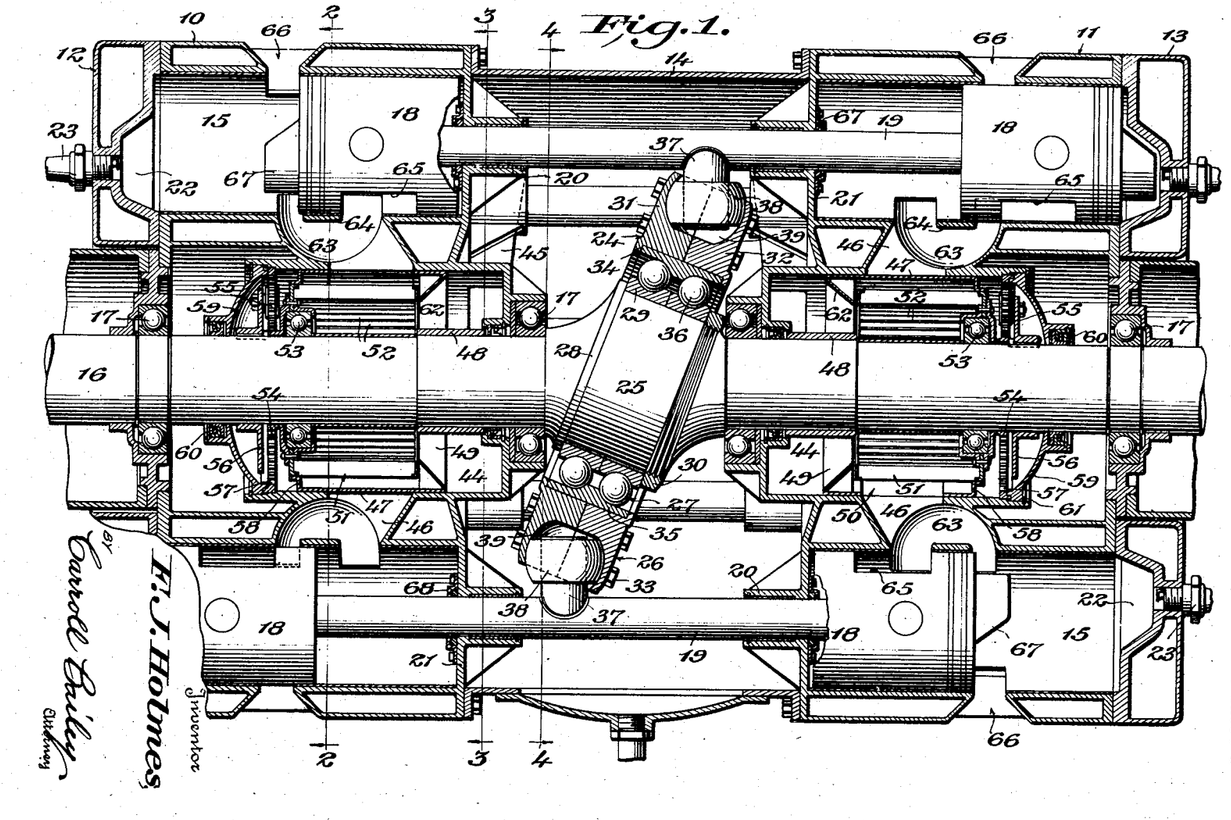
Figure 1 is a central, longitudinal section through an internal combustion engine constructed in accordance with one practical embodiment of the invention.
Figure 2:
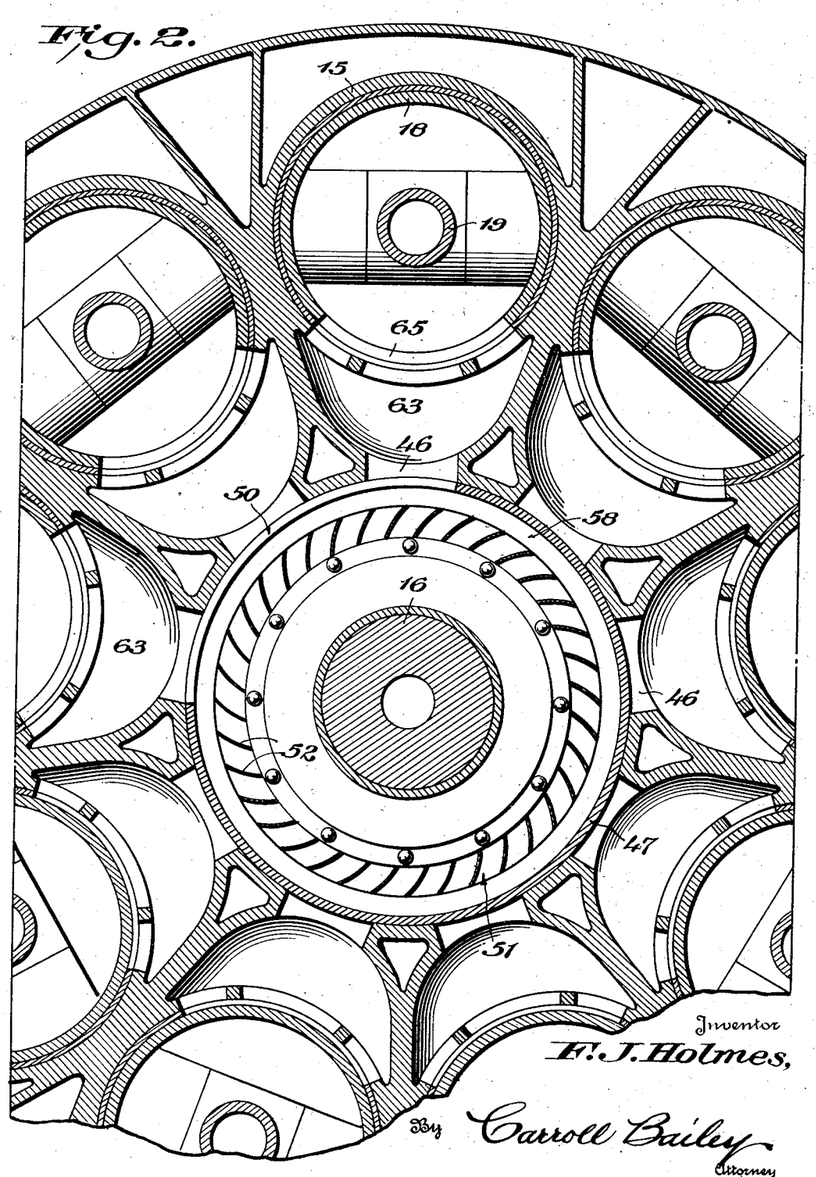
Figure 2 is an enlarged transverse section on the line 2—2 of Fig. 1.
Figure 4:
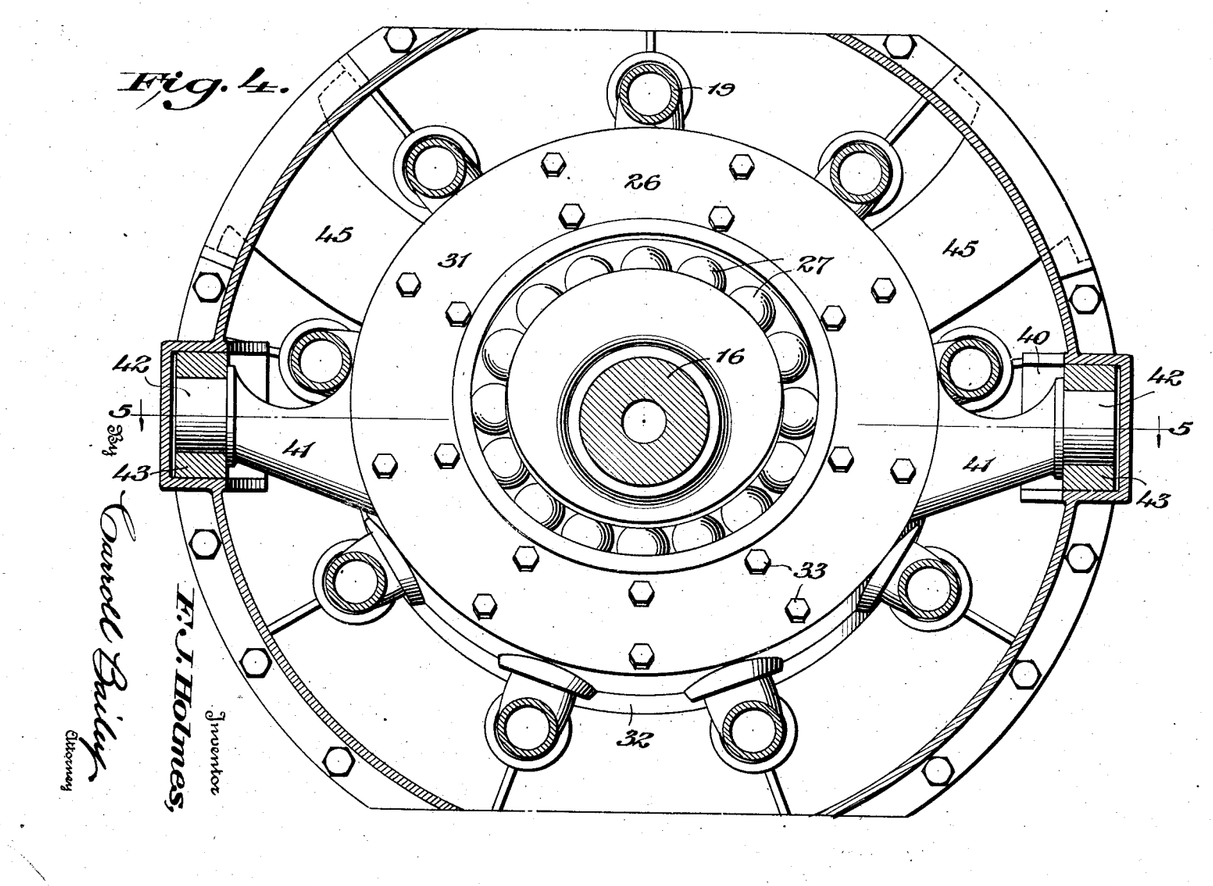
Figure 4 is an enlarged transverse section on the line 4—4 of Fig. 1.
Figure 5:
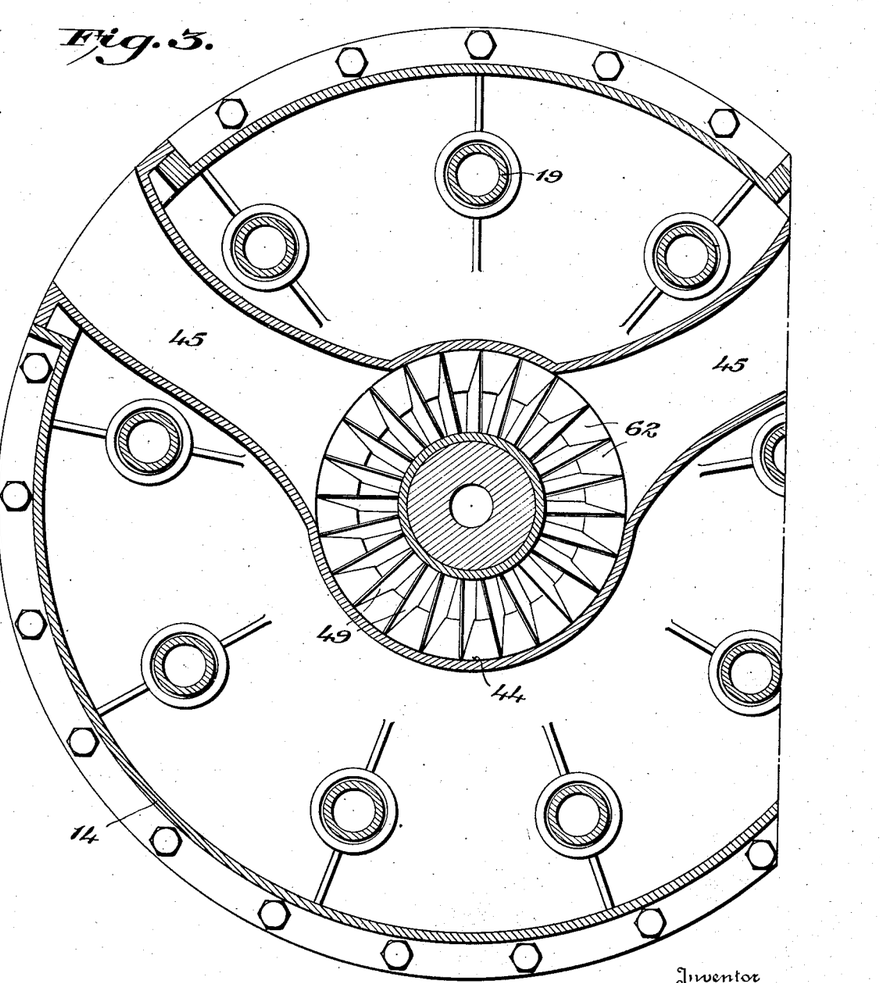
Figure 5 is a horizontal section on the line 5—5 of Fig. 4.
Figure 6:
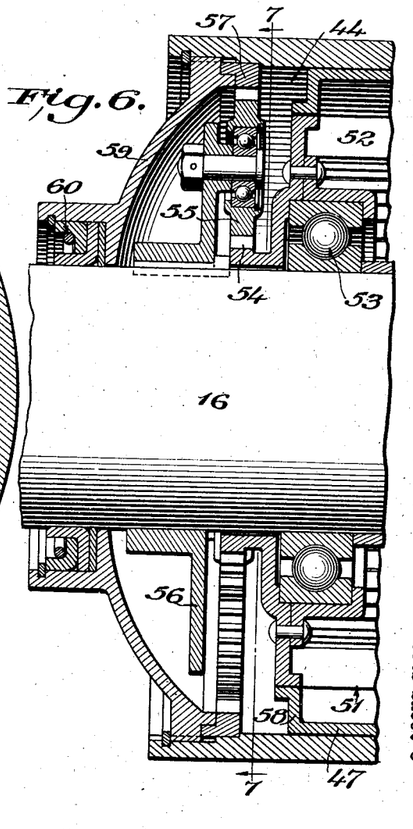
Figure 6 is an enlarged longitudinal section through a portion of the supercharging mechanism of the engine.
Figure 7:
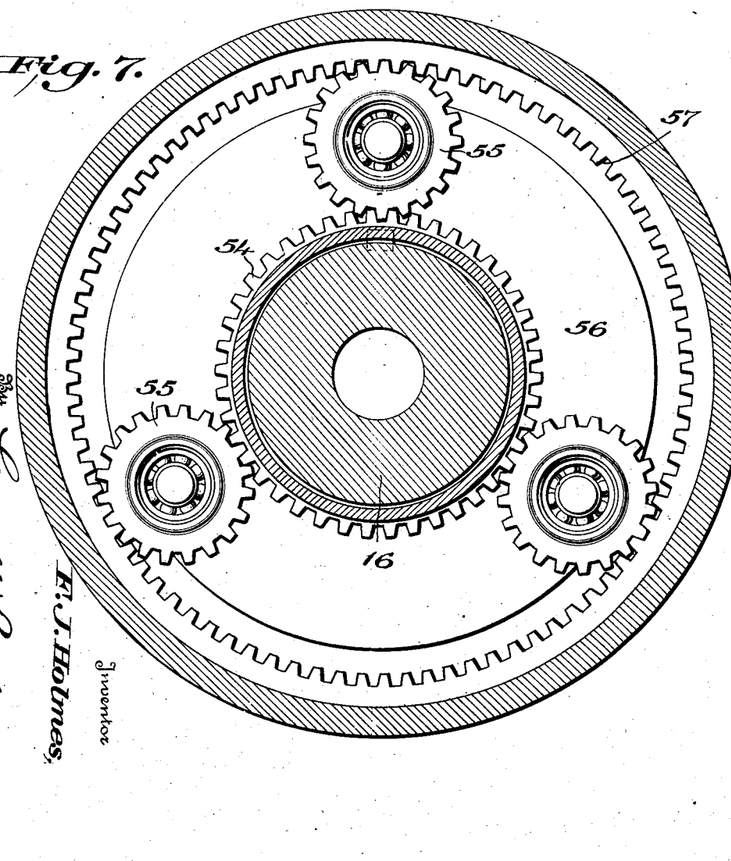
Figure 7 is a transverse section on the line 7—7 of Fig. 6.
Figure 8:
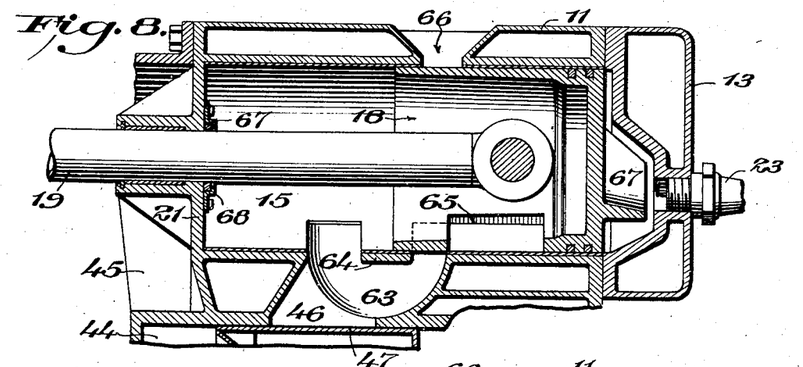
Figures 8, 9 and 10 are enlarged longitudinal sections through one of the cylinders of the engine illustrating the mode of operation of the engine.
Figure 9:
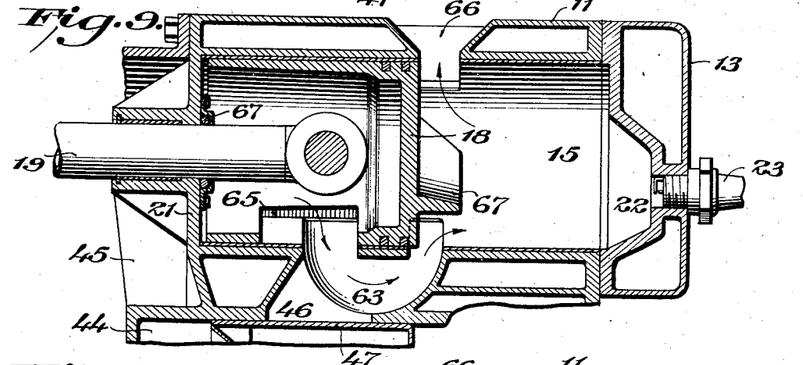
Figure 10:
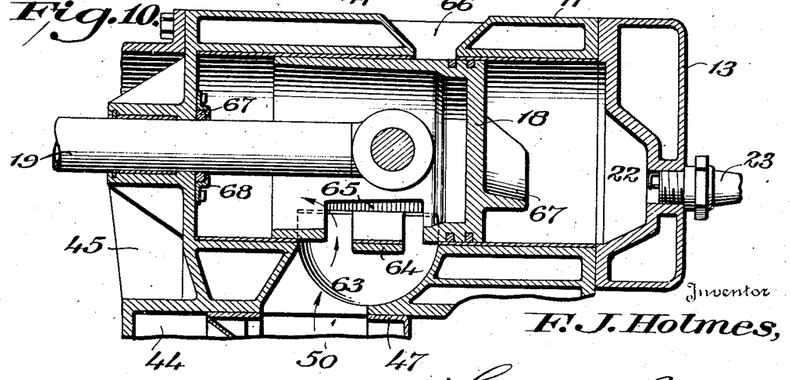

Figures 8 to 10 of the drawings illustrate a cycle of operation of one of the cylinders of the engine which latter, as shown and described, is of the two-stroke cycle type but which may be of the four-stroke cycle type if desired. Figure 8 illustrates the piston 18 as being at its limit of outward movement in the cylinder 15 and the assumption is that a charge of fuel is compressed in the combustion chamber 22 ready to be ignited by the spark plug 23 and that the inner end portion of the cylinder 15 and the interior of the piston 18 contain a charge of fuel which has been delivered thereto by the blower 51 during the outward or compression stroke of the piston. When the piston 18 is at its limit of outward movement in the cylinder 15 the valve 47 is in closing relationship to the duct 46 and the port 63 and remains in closing relationship thereto until the piston has completed its inward movement or power stroke, when the valve port 50 begins to register with the duct 46. Accordingly, when the charge in the combustion chamber 22 is ignited and the piston 18 thereby is driven inwardly, the charge in the inner end portion of the cylinder 15 is compressed until the outer end portion of the piston begins to move inwardly beyond the outer end of the port 63, whereupon the compressed charge in the inner end portion of the cylinder flows through the port 65 in the piston into the port 63 and through the outer end of the latter into the outer end portion of the cylinder in advance of the outer end of the piston (see Figure 9).

The exhaust port 66 is disposed to be opened either slightly in advance of, or simultaneously with, opening of the outer end of the intake port 63. Moreover, the head of the piston 18 is provided with a baffle plate 67 to prevent the supplied fuel from flowing directly across the cylinder to the exhaust port 66. Accordingly, as the piston 18 approaches its limit of inward movement in the cylinder 15 the exhaust port 66 is opened to permit escape of the products of combustion, and the inner end of the inlet port 63 is opened to admit a fresh charge to the cylinder space outwardly of the outer end of the piston 18. As the piston begins its outward or compression stroke the ports 63 and 66 are closed with respect to the outer end portion of the cylinder whereby the fresh charge is compressed, but the port 63 remains in communication with the inner end portion of the cylinder 15 through the port 65 in the side wall of the piston. The valve port 50 becomes registered with the duct 46 following a short amount of outward movement of the piston 18 from its innermost position. Thus, as the piston moves outwardly on its compression stroke, the inner end portion of the cylinder is supplied with a fresh charge of fuel so that the recounted cycle of operation may be repeated (see Figure 10).

While the bearings 20 may be relied upon as seals to prevent leakage of gaseous fuel from the inner ends of the cylinders 15 around the piston rods 19, separate seals of any suitable type preferably are provided for this purpose. In this connection and as illustrated in the present instance, sealing rings 67, preferably of the split, metallic, contractile type, are disposed in surrounding relationship to the piston rods 19 and against the inner faces of the end walls 21 of the cylinders 15 and are secured against said ends walls 21 by suitable retaining plates 68 which may be fastened to said end walls by screws or in any other suitable manner. Alternatively, said rings 67 may be secured in recesses in the end walls 21 of the cylinders by split retaining rings.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A hollow rotary valve having a side outlet port, means providing a substantially annular flange extending inwardly from one end of said valve and defining a central inlet opening in said end, and a hollow rotary blower in said valve coaxial therewith and of the type comprising an annular series of blades, said substantially annular flange extending inwardly into covering relationship to the adjacent ends of said blower blades to direct into said blower interiorly of the blades thereof fluid entering said inlet opening and to afford an obstruction against escape through said end of said valve of fluid forced outwardly by said blower.

2. A hollow rotary valve having a side outlet port, means providing a substantially annular flange extending inwardly from one end of said valve and defining a central inlet opening in said end, and a hollow rotary blower in said valve coaxial therewith and of the type comprising an annular series of blades, said substantially annular flange extending inwardly into covering relationship to the adjacent ends of said blower blades and being inclined toward said blower to afford a funnel-like mouth to direct into said blower interiorly of the blades thereof fluid entering said inlet opening and to afford an obstruction against escape through said end of said valve of fluid forced outwardly by said blower.

3. A hollow rotary valve having a side outlet port, a series of radial fan blades in one end of said valve, plates between said fan blades providing a substantially annular flange extending inwardly from said end of said valve and defining a central inlet opening in said end, and a hollow rotary blower in said valve coaxial therewith and of the type comprising an annular series of blades, said substantially annular flange extending inwardly into covering relationship to the adjacent ends of said blower blades to direct into said blower interiorly of the blades thereof fluid entering said inlet opening and to afford an obstruction against escape through said end of said valve of fluid forced outwardly by said blower.

4. A hollow rotary valve having a side outlet port, a series of radial fan blades in one end of said valve, plates between said fan blades providing a substantially annular flange extending inwardly from said end of said valve and defining a central inlet opening in said end, and a hollow rotary blower in said valve coaxial therewith and of the type comprising an annular series of blades, said substantially annular flange extending inwardly into covering relationship to the adjacent ends of said blower blades and being inclined toward said blower to afford a funnel-like mouth to direct into said blower interiorly of the blades thereof fluid entering said inlet opening and to afford an obstruction against escape through said end of said valve of fluid forced outwardly by said blower.

FREDERICK J. HOLMES.